United States Patent
Narayanaswami (10) Patent No.: US 6,288,722 B1
(45) Date of Patent: *Sep. 11, 2001

(54) FRAME BUFFER RECONFIGURATION DURING GRAPHICS PROCESSING BASED UPON IMAGE ATTRIBUTES

(75) Inventor: Chandrasekhar Narayanaswami, Valhalla, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,354

(22) Filed: Oct. 17, 1996

(51) Int. Cl.$^7$ .................................... G06T 17/00
(52) U.S. Cl. ............................................. 345/433
(58) Field of Search ................... 345/433, 473, 345/509

(56) References Cited

U.S. PATENT DOCUMENTS

| | | | |
|---|---|---|---|
| 4,823,286 | * 4/1989 | Lumelsky et al. | 364/521 |
| 4,876,644 | 10/1989 | Nuechterlein et al. | 364/200 |
| 5,008,838 | * 4/1991 | Kelleher et al. | 364/522 |
| 5,043,923 | * 8/1991 | Joy et al. | 364/522 |
| 5,062,057 | * 10/1991 | Blacken et al. | 364/518 |
| 5,274,760 | * 12/1993 | Schneider | 345/509 |
| 5,297,251 | * 3/1994 | Alcorn et al. | 395/158 |
| 5,367,632 | * 11/1994 | Bowen et al. | 345/464 |
| 5,402,147 | * 3/1995 | Chen et al. | 345/115 |
| 5,519,825 | * 5/1996 | Naughton et al. | 345/452 |
| 5,559,954 | * 9/1996 | Sakoda et al. | 345/464 |
| 5,689,313 | * 11/1997 | Sotheran | 345/509 |
| 5,724,560 | * 3/1998 | Johns et al. | 395/510 |
| 5,742,788 | * 4/1998 | Priem et al. | 345/437 |
| 5,742,796 | * 4/1998 | Huxley | 345/509 |
| 5,757,375 | * 5/1998 | Kawase | 345/509 |
| 5,835,104 | * 11/1998 | Hicok et al. | 345/506 |
| 5,860,076 | * 1/1999 | Greene et al. | 711/1 |

FOREIGN PATENT DOCUMENTS

| | | |
|---|---|---|
| 0 524 468 A2 | 1/1993 | (EP). |
| 2 223 651 A | 4/1990 | (GB). |
| 63-156487 A | 6/1988 | (JP). |
| 3-276987 | 9/1991 | (JP). |
| 4-263375 | 9/1992 | (JP). |
| 06332413 A | 2/1994 | (JP). |
| 07334138 | 12/1995 | (JP). |
| 10098692 A | 4/1998 | (JP). |

OTHER PUBLICATIONS

Computer Graphics: Principles and Practice, Addison–Wesley Publishing Company, pp. 201–281, 855–920 (1990).

Kendall Auel, "One frame ahead: frame buffer management for animation and real–time graphics," XP–000749898, pp. 43–50.

Richard Palm, et al., Design Entry, "LSI building blocks enhance performance of compact displays," XP–002107917, pp. 175–186.

\* cited by examiner

*Primary Examiner*—Cliff N. Vo
(74) *Attorney, Agent, or Firm*—Casey P. August, Esq.; Perman & Green, LLP (57) ABSTRACT

The present invention allows the frame buffer to be dynamically reconfigurable during the processing of graphics data. Lower resolution double buffer mode is used when objects are moving, and higher resolution single buffer mode is used when objects are stationary. The user gets the benefits of double buffering while objects are in motion, and the benefit of a higher quality image when objects are stationary. No image tears appear in this case because the graphics processing system redraws the exact same image when motion ceases, however the image has more bits per pixel. The visual effect is that the picture becomes clearer when motion ceases. The graphics processor quickly switches frame buffer modes during execution, and is not constrained to specifying one mode at the start of processing.

51 Claims, 3 Drawing Sheets

FRAME BUFFER RECONFIGURATION DURING GRAPHICS PROCESSING BASED UPON IMAGE ATTRIBUTES

FIELD OF THE INVENTION

The present invention relates to computer graphics systems, and more specifically, to computer graphics systems that render primitives utilizing at least two frame buffers and a z-buffer.

BACKGROUND OF THE INVENTION

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object. Rendering the scene for display on the two-dimensional display device is a computationally intensive process. It is therefore frequently a slow process, even with today's microprocessors and graphics processing devices.

Figure 1A:
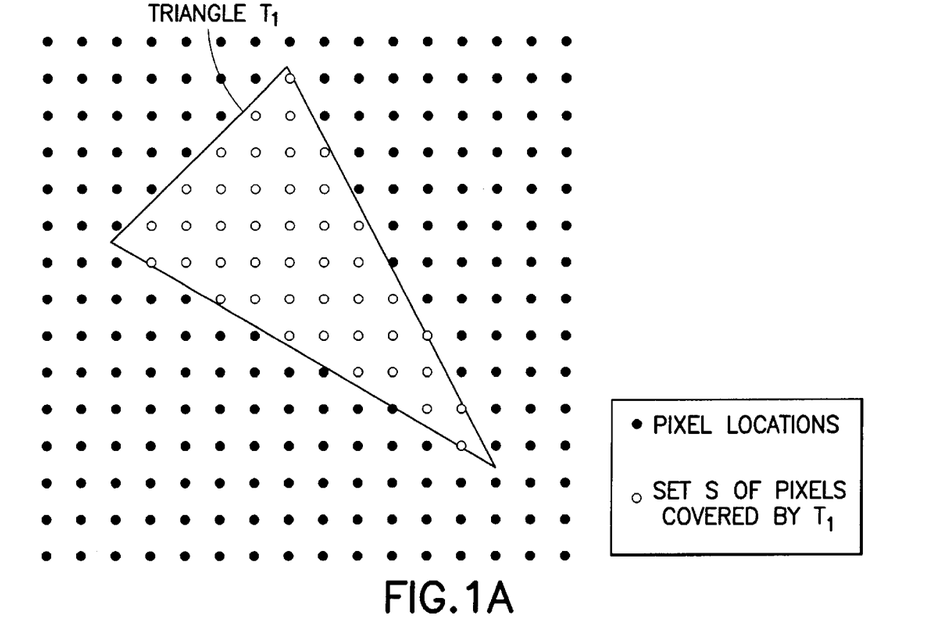
FIG. 1A is a pictorial representation of the rasterization of a triangle T1.

Rasterization, which is part of the rendering operation, is the process which converts the simple, geometric description of a graphics primitive into pixels for display. A typical primitive, as shown in FIG. 1A, is a triangle $T_1$. Other area or surface primitives conventionally are converted into one or more triangles prior to rasterization. The triangle $T_1$ is represented by the (x,y,z) coordinates and other properties (such as colors and texture coordinates) at each of its vertices. The (x,y) coordinates of a vertex tell its location in the plane of the display. The z-coordinate tells how far the vertex is from the selected view point of the three-dimensional scene. Rasterization may be divided into four tasks: scan conversion, shading, visibility determination, and frame buffer update.

Scan conversion utilizes the (x,y) coordinates of the vertices of each triangle to compute a set of pixels, S, which cover the triangle.

Shading computes the colors of the pixels within the set S. There are numerous schemes for computing colors, some of which involve computationally intensive techniques such as texture mapping.

Moreover, the rasterization process may include lighting calculations that simulate the effects of light sources upon the surfaces of the triangles of the scene. Typically, the position of each triangle is identified by (x,y,z) coordinates of a set of three vertices, with each vertex having a reflectance normal vector with the vertex at its origin. The reflectance normal vectors of each triangle, along with information about the position of the light sources, are used to calculate the effect of the light sources on the color values determined during the shading calculations for each triangle.

Figure 1B:
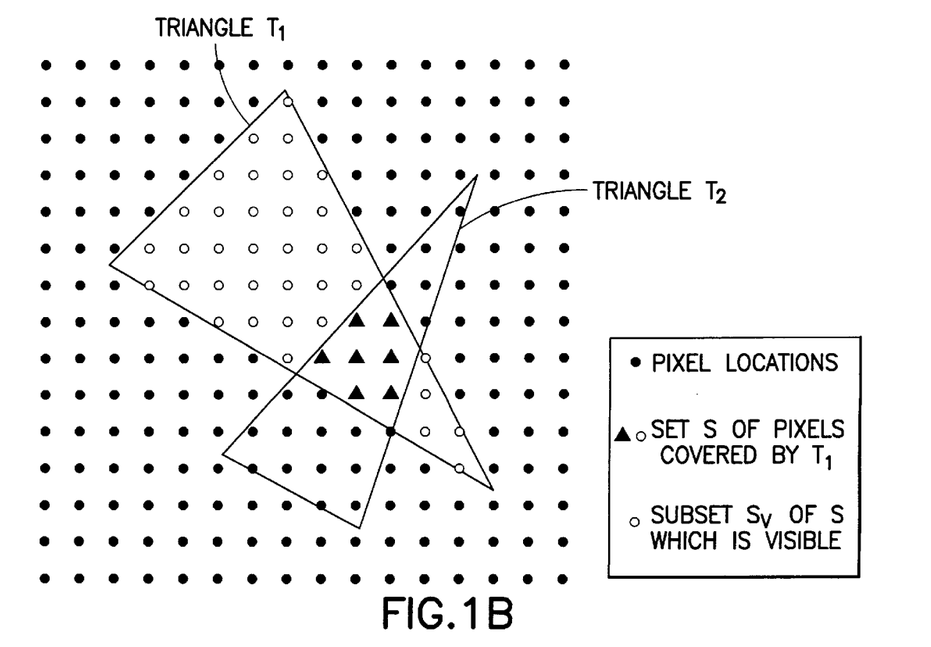
FIG. 1B is a pictorial representation of the rasterization of triangles T1 and T2, wherein triangle T1 is partially hidden by triangle T2.

Visibility determination utilizes the z-coordinate, also called the depth value, of each pixel to compute the set of pixels, $S_v$ (a subset of S), which are "visible" for the triangle. The set $S_v$ will differ from the set S if any of the pixels in set S cover the previously rasterized triangles whose z values are closer to the selected viewpoint. Thus, for each triangle in the scene, a pixel is "visible" if it is in the set $S_v$ or "hidden" if it is the set s but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, T1 and T2, wherein triangle T1 is partially hidden by triangle T2.

Rasterization is completed by writing the colors of the set of visible pixels $S_v$ to a frame buffer for display, and writing the z-coordinate of the set of visible pixels $S_v$ to a z-buffer.

The values stored in the frame buffer are converted to analog RGB (Red-Green-Blue) signals which are then fed to the display monitor. The data stored in the frame buffer is transferred to the display monitor at the monitor refresh rate, which typically exceeds 60 times per second and approaches 85 times per second on more expensive monitors.

One problem encountered by graphics processing systems is update of scene representations from one frame to the next. If the frame buffer is modified while it is being displayed on the monitor, the monitor displays portions of an earlier frame and portions of the current frame. This clearly causes confusing and distracting pictures. Therefore, three-dimensional graphics processing systems use double buffering to realize a smooth transition from one frame to the next. With this scheme the current frame is displayed on the monitor using one buffer (usually called the front buffer) and the next frame is written into another frame buffer (usually called the back buffer). When the next frame is ready, the buffer containing the next frame is switched to be the displayed frame buffer. The buffer that was switched out is used in the creation of the following frame. In the absence of two buffers, image tears would appear and objects would occur in screen positions corresponding to both the previous frame and the current frame. Many higher-end machines use hardware double buffering, while personal computers typically use software double buffering. In software double buffering, the buffer containing the next frame is quickly copied, as one contiguous block, into the displayed frame buffer area.

The main drawback of double buffering is the cost of the second frame buffer. As screen sizes and pixel depths increase, this drawback becomes more pronounced. For example, for a 1280×1024 pixel screen with 24-bit RGB (Red-Green-Blue color representation), the frame buffer contains 1.25 million pixels and uses 3.75 MB of memory. For a screen with HDTV resolution (1920×1035 pixels), the frame buffer uses approximately 6MB of memory. This extra memory can add significant cost to a typical graphics workstation.

In order to avoid the cost of the second frame buffer, existing solutions split the first frame buffer into two buffers and use fewer bits per pixel. For example a 24-bit RGB frame buffer will be partitioned into two 12-bit RGB frame buffers. Obviously this reduces the fidelity of the image. Present solutions that offer double buffering on a 24-bit graphics card split the 24 bits into two 12-bit banks for the complete life of a graphics application. Even still images are displayed with 12-bit RGB. This is unnecessary when objects are stationary. Double buffering is needed most in a dynamic environment when objects are moving. Consequently, there is a need for a double buffering mechanism that provides a higher quality image while using less memory.

SUMMARY OF THE INVENTION

Accordingly, the present invention allows the frame buffer to be dynamically reconfigurable during the processing of graphics data. Lower resolution double buffer mode is used when objects are moving, and higher resolution single buffer mode is used when objects are stationary. The user gets the benefits of double buffering while objects are in motion, and the benefit of a higher quality image when objects are stationary. No image tears appear in this case because the graphics processing program redraws the exact same image when motion ceases, however the image has more bits per pixel. The visual effect is that the picture becomes clearer when motion ceases. The graphics processor quickly switches frame buffer modes during execution, and is not constrained to specifying one mode at the start of processing.

Another aspect of the present invention comes from the realization that consecutive frames in a smooth double buffered sequence are not likely to be very different. Thus a differential coding scheme is used to perform double buffering without using two complete frame buffers. This results in substantial savings in memory over conventional double-buffering schemes.

The invention may be summarized as follows. There are three interpretations for pixels in the frame buffers. The first is where pixels in the front and back buffer have the same number of bits per pixel. This interpretation is similar to existing solutions. In a second interpretation, the pixel in the front buffer is coded as a differential from the pixel in the back buffer. In the third interpretation, a pixel has full resolution, i.e., 8 bits for R, 8 bits for G, and 8 bits for B (denoted as 888 RGB). The present invention utilizes all three interpretations, and switches between the three during processing of graphics data.

One feature of the invention is that as the next frame is being computed in the back buffer, some bits from the front buffer may be "stolen" in the differential mode so that the next frame appears better. This differential mode handles situations where the objects move slowly. Another feature is that if the pixel in the front buffer is currently equal to the clear value then the back buffer can use full resolution (888 RGB). This feature is useful when objects move with respect to a cleared background and uncover new areas in consecutive frames.

DETAILED DESCRIPTION OF THE PREFERRED EMBODIMENTS

Figure 2:
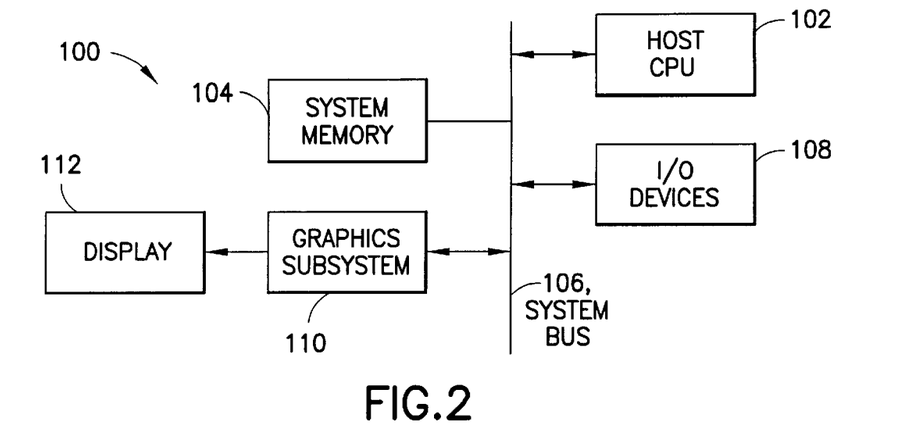
FIG. 2 is a functional block diagram of a computer graphics system.

FIGS. 1A and 1B were described in the Background of the Invention section above. As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene.

Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any graphics processing software. As is conventional, the graphics data and graphics processing software are loaded from the non-volatile storage to the system memory 104 for access by the host processor 102.

Figure 3:
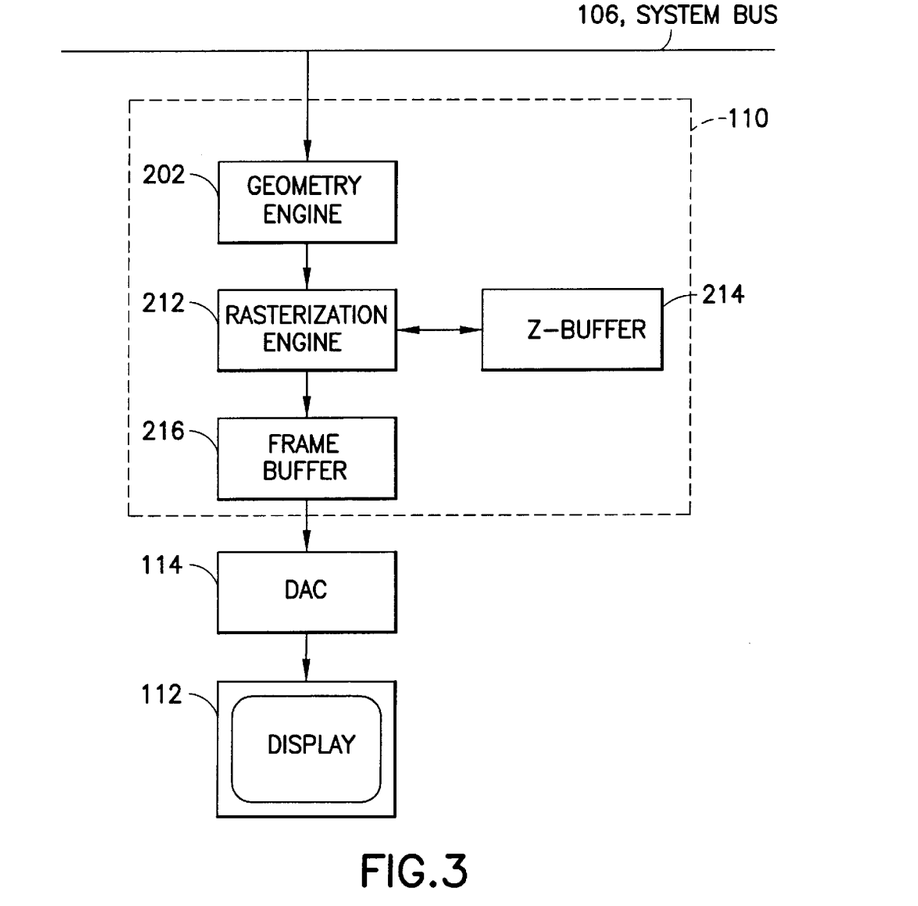
FIG. 3 is a functional block diagram of the graphics subsystem of the computer graphics system of FIG. 1.

The graphics system 100 also includes a graphics subsystem 110 that interfaces to the system memory 104 via the system bus 106. Generally, the graphics subsystem 110 operates to render the graphics data stored in the system memory 104 for display on a display area of a display device 112 according to graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically are generated by graphics processing programs that are stored in the system memory 104 and executed by the system processor 102. The graphics orders typically consist of a sequence of data blocks that include, or point to, the graphics data (e.g. coordinates and attributes of one or more objects) that defines the objects of the scene, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining the reflectance normal vectors for the vertices of each primitive. The values of these coordinates and normal vectors are assumed to be specified in a coordinate system designated as the model coordinate system.

Although the graphics subsystem 110 is illustrated as part of a graphics work station, the scope of the present invention is not limited thereto. Moreover, the graphics subsystem 110 of the present invention as described below may be implemented in hardware, such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 110 (or portions thereof) as described below may be implemented in software together with a processor. The processor may be a conventional general purpose processor, a part of the host processor 102, or part of a co-processor integrated with the host processor 102.

A more detailed description of the geometric transformations performed by the geometry engine 202 may be found in Foley et. al., "Computer Graphics: Principles and Practice", pp. 201–281 (2nd Ed. 1990 ), and in U.S. patent application Ser. No. 08/586,266, entitled Computer Graphics System Having Efficient Texture Mapping with Perspective Correction, filed, Jan. 16, 1996 herein incorporated by reference in their entirety. In addition, depending upon the shading algorithm to be applied, an illumination model is evaluated at various locations (i.e., the vertices of the primitives and/or the pixels covered by a given primitive).

As shown in FIG. 3, the graphics data generated by the geometry engine, which represents the transformed primitives in the normalized device coordinate system, is then passed on to a rasterization engine 212 that converts the transformed primitives into pixels, and generally stores each primitive's contribution at each pixel in at least one frame buffer 216 and a z-buffer 214. The operation of the rasterization stage 212 may be divided into three tasks as described above: scan conversion, shading, and visibility determination. The pixel data is periodically output from the frame buffer 216 for display on the display device 112. The functionality of the geometry engine 202 and rasterization engine 212 may be organized in a variety of architectures. A more detailed discussion of such architectures may be found in Foley et. al., "Computer Graphics: Principles and Practice", pp. 855–920 (2nd Ed. 1990 ), herein incorporated by reference in its entirety.

The frame buffer 216 typically stores pixel data that represents the color of each pixel of the display area of the display device 112. In the alternative, the pixel data stored in the frame buffer 216 may be scaled up or down to satisfy the resolution of the display area of the display device. The description below assumes that the frame buffer 216 stores pixel data that represents the color of each pixel of the display area of the display device 112. The pixel data is periodically output from the frame buffer 216 for display in the display area of the display device 112.

In addition, the graphics subsystem 110 may include more than one frame buffer. As is conventional, one of the frame buffers (front buffer) serves as the active display portion, while another one of the frame buffers (back buffer) may be updated for subsequent display. Any one of the frame buffers may change from being active to inactive in accordance with the needs of the system.

Figures 4, 5:
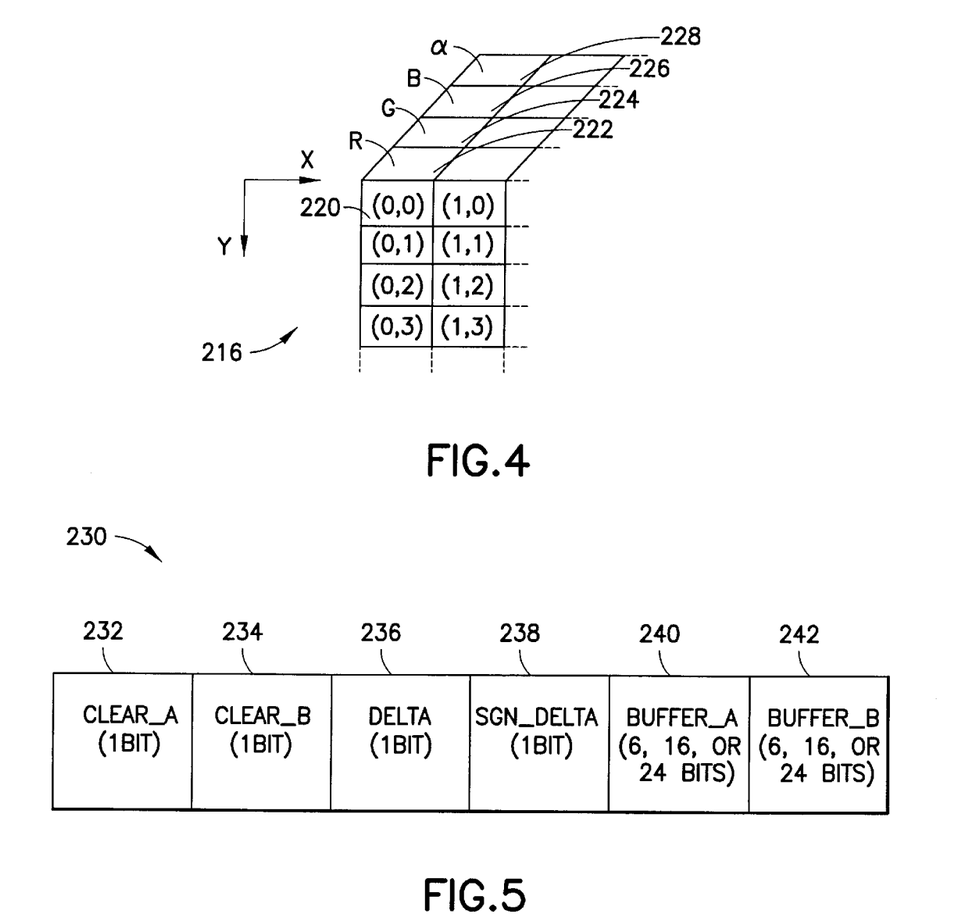
FIG. 4 is a pictorial illustration of the organization of the frame buffer of the graphics subsystem of FIG. 2 according to the present invention.
FIG. 5 is pictorial illustration of a pixel word in the frame buffer of FIG. 4 according to the present invention.

FIG. 4 illustrates the organization of the frame buffer 216. For each pair of x and y coordinates, data is stored representing R, G, B, and Alpha (Alpha is a transparency factor). For example, for location (0,0) 220, R data 222, G data 224, B data 226, and Alpha data 228 is stored in the frame buffer. The set of R, G, B and Alpha data stored at a location is called a pixel word.

Thus the overall flow for our rendering system is as follows. The graphics processing program first clears the first frame by writing the clear value to every pixel in the frame. Then it draws the objects visible in the frame. This frame is drawn into the frame buffer in a conventional manner and displayed on the monitor. Then the program clears the next frame to get a clean start and then draws the next frame. During this process, when a pixel is to be written to the back buffer the corresponding location in the front buffer is checked to determine if the pixel in the corresponding location in the front buffer was set to the clear value. If this is the case, the bits used by the front buffer are "stolen" from the front buffer and attached to the back buffer. The mode bits for the pixel are set appropriately to indicate this condition. If bits cannot be stolen from the front buffer in the above manner, the color value in the front buffer is compared with the color value in the back buffer. If the values so compared are close to each other, the value of the pixel in the front buffer is stored as a differential from the value of the pixel in the back buffer. Since the differential is expected to be small, fewer bits are needed to store the differential than the complete color. If neither of the above conditions is satisfied, the conventional algorithm is used to partition the frame buffer into the front buffer and back buffer. In this case the front buffer and back buffer would have the same number of bits.

While the above is happening in the rendering subsystem, the display sub-system continuously looks at the pixel mode and converts it into the right color value and displays it. This is called the frame buffer scan out operation.

Our method uses up to three interpretations for pixels in our frame buffer. One is where pixels in the front and back buffer have the same number of bits per pixel. This is similar to existing solutions. In another mode the pixel in the front buffer is coded as a differential from the pixel in the back buffer. In the last mode a pixel has full resolution, i.e., 888 RGB. The key feature is that as the next frame is being computed in the back buffer, some bits from the front buffer may be stolen so that the frame to appear at the next buffer swap looks better. Another feature is that if the pixel in the front buffer is currently equal to the clear value then the back buffer can use 888 RGB. This is useful when objects move with respect to a cleared background and uncover new areas in consecutive frames. The differential mode handles situations where the objects move slowly.

With a 36-bit frame buffer, one could use it as two 666 RGB buffers. We allow this mode too, but in several cases we can do better with the above scheme.

More specifically, the 36 bits per pixel frame buffer will be partitioned into clear bits, a front buffer, and a back buffer as shown in FIG. 5. The pixel word 230 depicted in FIG. 5 is divided into several sections. When CLEAR_A 232 is 1, this indicates that buffer A is cleared. When CLEAR_B 234 is 1, this indicates that buffer B is cleared. When DELTA 236 is 1 and SGN_DELTA 238 is 0, this indicates that the front buffer is equal to the value of the back buffer plus DELTA 236. When DELTA 236 is 1 and SGN_DELTA 238 is 1, this indicates that the front buffer is equal to the value of the back buffer minus DELTA 236. When DELTA 236 is 0 and SGN_DELTA 238 is 1, this indicates that BUFFER_A 240 and BUFFER_B 242 both contain 16 bits. This is called split mode.

BUFFER_A 240 and BUFFER_B 242 can be RGB 565, RGB 888, or RGB 222 depending on the situation. An RGB representation of 565 means that the red component is represented with five bits, the green component with six bits, and the blue component with five bits. Thus the line between BUFFER_A 240 and BUFFER_B 242 in the pixel word 230 depicted in FIG. 5 can shift over time. Moreover, this line can be different for each pixel on the screen.

The following registers are also used:

DBF: When set to 1, indicates that double buffering mode is used.

FRONT_CLEAR_VALUE: The value to which the front buffer was cleared.

BACK_CLEAR_VALUE: The value to which the back buffer was cleared.

FRONT_IS_A: If set to 1, indicates that BUFFER_A is the front buffer.

Several assumptions are made in the preferred embodiment of the present invention. It is assumed that the front buffer's clear bits can not be changed. It is further assumed that frames (colors) are always written to the back buffer. Finally, it is assumed that the delta bits are cleared at buffer swap time, because just after a swap the front buffer is not coded as a delta from the back buffer.

The following code segments are presented as one embodiment of the present invention. For specificity, we present our method for the case where the frame buffer has 36 bits per pixel. The method can be used for frame buffers with both more or fewer bits per pixel. For example purposes only, the code segments are shown using a combination of C and pseudo-code. Other programming languages could of course be used.

Frame Buffer Writing Algorithm

This code segment illustrates a pixel being written into the frame buffer.

```
mark BACK buffer as not clear
if (front pixel is clear) {
/* BACK can use some of the front bits  */
/* This continues until this front (a    */
/* future BACK) gets written into        */
   write RGB as 888 in extended BACK buffer;
   SGN_DELTA = 0;   /* to indicate that full     */
                    /* resolution mode was used  */
}
else {  /* using split mode or delta coding */
   determine whether delta coding can be done by
   checking differences;
   if (using delta coding) {
      if (DELTA = 1 already) {
      /* a previous hit to a pixel in this frame */
      get old_front with delta mode;
      write BACK as RGB 888;
      DELTA = |BACK - old_front|;
      if (old_front > BACK) SGN_DELTA = 0;
      else SGN_DELTA = 1;
   }
   else {
      if (SGN_DELTA = 1) {/* split mode was used earlier */
         get old_front with split mode;
      }
      else {
         get old_front with full resolution mode;
      }
      write BACK as RGB 888;
      DELTA = |BACK - old_front|;
      if (old_front > BACK) SGN_DELTA = 0;
      else SGN_DELTA = 1;
      set DELTA to 1;
   }
}
else {  /* using split mode */
   if (DELTA = 1) {
      /* a previous hit to this pixel in this frame */
      get old_front with delta mode;
      compute new_front in 565 mode using FRAME_R_RANGE;
      write BACK as RGB 565;
      /* indicate that we are now in split mode */
      DELTA = 0;
      SGN_DELTA = 1;
   }
   else {
      write BACK as RGB 565;
   }
}
}
```

Frame Buffer Scan Out Algorithm

One assumption we make is that a read and a write to a pixel do not happen at the same time. This is easy enough to accomplish because the scan out occurs in a sequential fashion. In the worst case, this will induce a small wait.

```
if (FRONT is clear) {
   read out FRONT_VALUE_CLEAR;
}
else { /*split mode or delta coded */
   if (split mode) {
      read out RGB 565 from FRONT buffer;
   }
   else { /* delta mode */
      get BACK pixel value;
      if (SGN_DELTA = 0) {
         FRONT = BACK + DELTA;
      }
      else FRONT = BACK - DELTA;
      display FRONT;
   }
}
```

Frame Buffer Clearing Algorithm

Clear out the clear bits for the BACK buffer

Frame Buffer Swapping Algorithm toggle FRONT_IS_A clear out the delta bits for the complete frame buffer Further improvements are possible. With the present scheme, the DELTA value can be 0, 1, 2, or 3. We can modify this so that DELTA takes values of 0, 2, 4, or 6, assuming that an error of 1 does not make a major difference in the image, and use the saved bit as a sign bit. This will allow delta coding to work for differences up to 6 in both the plus and minus directions. A running counter for the minimum and maximum colors in each frame could be maintained. If the color range is small the 565 mode can be better exploited.

We have explained the 36-bit buffer case. Other sizes are also possible. The single buffered mode could use more than RGB 888. It could use RGB 12, 12, 12 as is desired in medical graphics processings. Adding and subtracting DELTA can be done with a combinatorial circuit. There are only 256 distinct values for color and 4 distinct values for DELTA. Thus, there are 8 output bits, each of which depends on (8+2)=10 input bits. We described the invention coding each pixel independently of the other. However, in alternative embodiments, a block of pixels from the front buffer may be difference encoded with the corresponding block of pixels in the back buffer. This scheme improves the image quality over the scheme that treats each pixel individually.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A method for processing image data for display on a display device, comprising the steps of:

determining a composite pixel buffer area, the composite pixel buffer area having:
   a current display frame buffer;
   a next frame buffer;

comparing, on a successive frame by frame basis, the number being prepared for display in the next frame buffer; and resizing the number of bits per pixel data storage locations in the next frame buffer, for storing the number of bits per pixel data being prepared for display in the next frame buffer, based on said step of comparing.

2. A method according to claim 1, wherein the resizing step further comprises the steps of:
   configuring said frame buffer as a single buffer when the data to be displayed on said display device represents an object in a first state; and
   configuring said frame buffer as a double buffer when the data to be displayed on said display device represents an object in a second state.

3. A method according to claim 1 wherein the configuring step further comprises the steps of:
   allocating one or more bits to represent attribute information for a first frame;
   allocating one or more bits to represent attribute information for a second frame;
   allocating one or more bits to indicate a status of said first frame; and
   allocating one or more bits to indicate a status of said second frame.

4. A method according to claim 3, further comprising the steps of:
   dynamically changing the number of bits allocated to said first frame; and
   dynamically changing the number of bits allocated to said second frame.

5. A method according to claim 4, wherein the step of dynamically changing the number of bits allocated to said first frame further comprises the steps of:
   reading the bits allocated to indicate the status of said first frame;
   calculating the number of bits to be allocated to represent attribute information for said first frame; and
   changing the number of bits allocated to represent attribute information for said first frame.

6. A method according to claim 4, wherein the step of dynamically changing the number of bits allocated to said second frame further comprises the steps of:
   reading the bits allocated to indicate the status of said second frame;
   calculating the number of bits to be allocated to represent attribute information for said second frame; and
   changing the number of bits allocated to represent attribute information for said second frame.

7. A method for processing image data for optimizing a number of bits per pixel data storage locations for display on a display device, comprising the steps of:
   determining a composite pixel buffer area, the composite pixel buffer area having:
      a first buffer;
      a second buffer;
   storing first image data representing a first image to be displayed in said first buffer, wherein said first image data comprises one or more attributes for each pixel;
   transferring said first image data to said display device for display;
   storing second image data representing a second image to be displayed in said second buffer, wherein said step of storing second image data comprises the steps of:
      calculating a difference between said first image data and said second image data for a pixel or a block of pixels; and
      when the difference is less than a predetermined amount, dynamically resizing a number of buffer bits per pixel so as to accommodate the storage of a value that is indicative of the calculated difference.

8. A system for displaying graphical data representing three-dimensional objects comprising:
   one or more processors;
   a display device for viewing graphical data representing three-dimensional objects;
   a storage system;
   one or more input/output devices for a user to input data to the system; and
   a graphics subsystem comprising:
      a control unit for supervising the operation of said graphics subsystem;
      means for transforming graphics primitives from a model coordinate system into a normalized device coordinate system;
      means for determining portions of said transformed graphics primitives which are potentially visible;
      means for determining whether the data to be displayed on said display device represents an object that is in one of a plurality of predetermined states;
      a first buffer area for storing depth information for each available pixel on said display device;
      means for storing said depth information;
      a second buffer area for storing color information for each available pixel on said display device; and
      means for configuring said second buffer area to one of a plurality of configurations, for storing said color information, in accordance with said determined state; and
      means for displaying said pixels on said display device;
      wherein, said configuring means comprises a comparator for comparing, on a successive frame by frame basis, a number of bits per pixel data stored in the second buffer for a current frame and the number of bits per pixel data being prepared for display in a next frame, said configuring means operating to resize bit per pixel data storage locations in said second buffer, for storing the pixel data being prepared for display in the next frame, based on an output of said comparator.

9. A system according to claim 8, wherein the means for configuring further comprises:
   means for configuring said buffer as a single buffer when the data to be displayed on said display device represents an object in a first state; and
   means for configuring said buffer as a double buffer when the data to be displayed on said display device represents an object in a second state.

10. A system according to claim 8 wherein the means for configuring further comprises:
    means for allocating one or more bits to represent attribute information for a first frame;
    means for allocating one or more bits to represent attribute information for a second frame;
    means for allocating one or more bits to indicate a status of said first frame; and
    means for allocating one or more bits to indicate a status of said second frame.

11. A system according to claim 10, wherein the means for configuring further comprises:
    means for dynamically changing the number of bits allocated to said first frame; and
    means for dynamically changing the number of bits allocated to said second frame.

12. A system according to claim 11, wherein the means for dynamically changing the number of bits allocated to said first frame further comprises:

means for reading the bits allocated to indicate the status of said first frame;

means for calculating the number of bits to be allocated to represent attribute information for said first frame; and means for changing the number of bits allocated to represent attribute information for said first frame.

13. A system according to claim 11, wherein the means for dynamically changing the number of bits allocated to said second frame further comprises:

means for reading the bits allocated to indicate the status of said second frame;

means for calculating the number of bits to be allocated to represent attribute information for said second frame; and means for changing the number of bits allocated to represent attribute information for said second frame.

14. A system for processing of image data for optimizing a number of bits per pixel data storage locations for display on a display device, comprising:

means for storing first image data representing a first image to be displayed in said first buffer, wherein said first image data comprises one or more attributes for each pixel;

means for transferring said first image data to said display device for display;

means for storing second image data representing a second image to be displayed, in said second buffer, wherein said storing means comprises:

means for calculating a difference between said first image data and said second image data for a pixel or a block of pixels; and when the difference is less than a predetermined amount, means for dynamically resizing a number of buffer bits per pixel so as to accommodate the storage of a value that is indicative of the calculated difference.

15. A graphics subsystem comprising:

a control unit for supervising the operation of said graphics subsystem;

means for transforming graphics primitives from a model coordinate system into a normalized device coordinate system;

means for determining portions of said transformed graphics primitives which are potentially visible;

means for determining whether the data to be displayed on said display device represents an object that is in one of a plurality of predetermined states;

a first buffer area for storing depth information for each available pixel on said display device;

means for storing said depth information;

a second buffer area for storing color information for each available pixel on said display device; and means for configuring said second buffer area to one of a plurality of configurations, for storing said color information, in accordance with said determined state; wherein, said configuring means comprises a comparator for comparing, on a successive frame by frame basis, the number of bits per pixel data stored in said second buffer area for a current frame and the number of bits per pixel data being prepared for display in a next frame, said configuring means operating to resize bit per pixel data storage locations in said second buffer area, for storing the pixel data being prepared for display in the next frame, based on an output of said comparator.

16. A graphics subsystem according to claim 15, wherein the means for configuring further comprises:

means for configuring said buffer as a single buffer when the data to be displayed on said display device represents an object in a first state; and means for configuring said buffer as a double buffer when the data to be displayed on said display device represents an object in a second state.

17. A graphics subsystem according to claim 15 wherein the means for configuring further comprises:

means for allocating one or more bits to represent attribute information for a first frame;

means for allocating one or more bits to represent attribute information for a second frame;

means for allocating one or more bits to indicate a status of said first frame; and means for allocating one or more bits to indicate a status of said second frame.

18. A graphics subsystem according to claim 17, wherein the means for configuring further comprises:

means for dynamically changing the number of bits allocated to said first frame; and means for dynamically changing the number of bits allocated to said second frame.

19. A graphics subsystem according to claim 18, wherein the means for dynamically changing the number of bits allocated to said first frame further comprises:

means for reading the bits allocated to indicate the status of said first frame;

means for calculating the number of bits to be allocated to represent attribute information for said first frame; and means for changing the number of bits allocated to represent attribute information for said first frame.

20. A graphics subsystem according to claim 18, wherein the means for dynamically changing the number of bits allocated to said second frame further comprises:

means for reading the bits allocated to indicate the status of said second frame;

means for calculating the number of bits to be allocated to represent attribute information for said second frame; and means for changing the number of bits allocated to represent attribute information for said second frame.

21. A method for processing of image data by optimizing a number of bits per pixel data storage locations for display on a display device, comprising the steps of:

allocating a first portion of a frame buffer to store data representing a first frame to be displayed;

allocating a second portion of the frame buffer to store data representing a second frame to be displayed subsequent to the first frame; and resizing on a successive frame by frame basis a bit per pixel size of the first portion of the frame buffer and a bit per pixel size of the second portion of the frame buffer in accordance with pixel data comparisons between the first and second frames as the first frame is being displayed.

22. A method according to claim 21, wherein said step of allocating a first portion of a frame buffer comprises the step of allocating a first set of bits to represent attribute information for the first frame, and said step of allocating a second portion of a frame buffer comprises the step of allocating a second set of bits to represent attribute information for the second frame.

23. A method according to claim 22, wherein the attribute information for the first frame and the attribute information for the second frame comprise color data.

24. A method according to claim 22, wherein the attribute information for the first frame and the attribute information for the second frame comprise depth data.

25. A method according to claim 21, further comprising the steps of:
for each pixel of the display device, allocating a field, comprised of a plurality of bits;
for at least one field, assigning a first set of bits to store data representing a display of the associated pixel as part of the first frame to be displayed; and
for at least one field, assigning a second set of bits to store data representing a display of the associated pixel as part of the second frame to be displayed subsequent to the first frame.

26. A method according to claim 25, wherein said changing step comprises the steps of:
for at least one field, changing the bits assigned to the first set and the second set, if the bits assigned to the first set satisfy a predetermined criterion.

27. A method according to claim 26, wherein the bits assigned to the first set satisfy the predetermined criterion if the bits assigned to the first set are equal to a stored value.

28. A method according to claim 25, further comprising the steps of:
for at least one field, generating an encoding of a data value for the field, wherein the data value is based upon a data stored by the first set of bits; and
storing the encoding as bits in the second set of bits.

29. A method according to claim 28, wherein the encoding represents a difference between the first set of bits and the second set of bits.

30. A method according to claim 29, wherein the encoding is generated upon determining that the difference is less than a predetermined minimum difference.

31. A graphics subsystem for processing of image data for display on a display device, comprising:
means for allocating a first portion of a frame buffer to store data representing a first frame to be displayed;
means for allocating a second portion of the frame buffer to store data representing a second frame to be displayed subsequent to the first frame; and
resizing on a successive frame by frame basis a bit per pixel size of the first portion of the frame buffer and a bit per pixel size of the second portion of the frame buffer in accordance with pixel data comparisons between the first and second frames as the first frame is being displayed.

32. A graphics subsystem according to claim 31, wherein said means for allocating a first portion of a frame buffer comprises means for allocating a first set of bits to represent attribute information for the first frame, and said means for allocating a second portion of a frame buffer comprises means for allocating a second set of bits to represent attribute information for the second frame.

33. A graphics subsystem according to claim 32, wherein the attribute information for the first frame and the attribute information for the second frame comprise color data.

34. A graphics subsystem according to claim 32, wherein the attribute information for the first frame and the attribute information for the second frame comprise depth data.

35. A graphics subsystem according to claim 31, further comprising:
for each pixel of the display device, means for allocating a field, comprised of a plurality of bits;
for at least one field, means for assigning a first set of bits to store data representing a display of the associated pixel as part of the first frame to be displayed; and
for at least one field, means for assigning a second set of bits to store data representing a display of the associated pixel as part of the second frame to be displayed subsequent to the first frame.

36. A graphics subsystem according to claim 35, wherein said means for changing comprises:
for at least one field, means for changing the bits assigned to the first set and the second set, if the bits assigned to the first set satisfy a predetermined criterion.

37. A graphics subsystem according to claim 36, wherein the bits assigned to the first set satisfy the predetermined criterion if the bits assigned to the first set are equal to a stored value.

38. A graphics subsystem according to claim 35, further comprising:
for at least one field, means for generating an encoding of a data value for the field, wherein the data value is based upon a data stored by the first set of bits; and
means for storing the encoding as bits in the second set of bits.

39. A graphics subsystem according to claim 38, wherein the encoding represents a difference between the first set of bits and the second set of bits.

40. A graphics subsystem according to claim 39, wherein the encoding is generated upon determining that the difference is less than a predetermined minimum difference.

41. A system for processing of image data for display on a display device, comprising:
one or more processors;
a display device;
a storage system;
one or more input/output devices; and
a graphics subsystem comprising:
means for allocating a first portion of a frame buffer to store data representing a first frame to be displayed;
means for allocating a second portion of the frame buffer to store data representing a second frame to be displayed subsequent to the first frame; and
means for dynamically changing, on a successive frame by frame basis in accordance with pixel data comparisons, a bit per pixel size of the first portion of the frame buffer and a bit per pixel size of the second portion of the frame buffer as the first frame is being displayed.

42. A system according to claim 41, wherein said means for allocating a first portion of a frame buffer comprises means for allocating a first set of bits to represent attribute information for the first frame, and said means for allocating a second portion of a frame buffer comprises means for allocating a second set of bits to represent attribute information for the second frame.

43. A system according to claim 42, wherein the attribute information for the first frame and the attribute information for the second frame comprise color data.

44. A system according to claim 42, wherein the attribute information for the first frame and the attribute information for the second frame comprise depth data.

45. A system according to claim 41, further comprising:
for each pixel of the display device, means for allocating a field, comprised of a plurality of bits;
for at least one field, means for assigning a first set of bits to store data representing a display of the associated pixel as part of the first frame to be displayed; and for at least one field, means for assigning a second set of bits to store data representing a display of the associated pixel as part of the second frame to be displayed subsequent to the first frame.

46. A system according to claim 45, wherein said means for changing comprises:

for at least one field, means for changing the bits assigned to the first set and the second set, if the bits assigned to the first set satisfy a predetermined criterion.

47. A system according to claim 46, wherein the bits assigned to the first set satisfy the predetermined criterion if the bits assigned to the first set are equal to a stored value.

48. A system according to claim 45, further comprising:

for at least one field, means for generating an encoding of a data value for the field, wherein the data value is based upon a data stored by the first set of bits; and means for storing the encoding as bits in the second set of bits.

49. A system according to claim 48, wherein the encoding represents a difference between the first set of bits and the second set of bits.

50. A system according to claim 49, wherein the encoding is generated upon determining that the difference is less than a predetermined minimum difference.

51. A system for processing of image data for display on a display device, comprising:

one or more processors;

a display device;

a storage system;

one or more input/output devices; and a graphics subsystem comprising:

means for determining a total number of bit storage locations available for storing pixel data;

means for allocating a first portion of the total number of bit storage locations available to store pixel data representing a first frame to be displayed;

means for allocating a second portion of the total number of bit storage locations available to store pixel data representing a second frame to be displayed subsequent to the first frame; and means for changing, on a successive frame by frame basis in accordance with pixel data comparisons, the number of bits allocated to the first portion of the frame buffer and the number of bits allocated to the second portion of the frame buffer as the first frame is being displayed.

* * * * *